C. J. & O. F. DUNCAN.
FEEDER.
APPLICATION FILED OCT. 30, 1913.
1,114,681.
Patented Oct. 20, 1914.
3 SHEETS—SHEET 1.
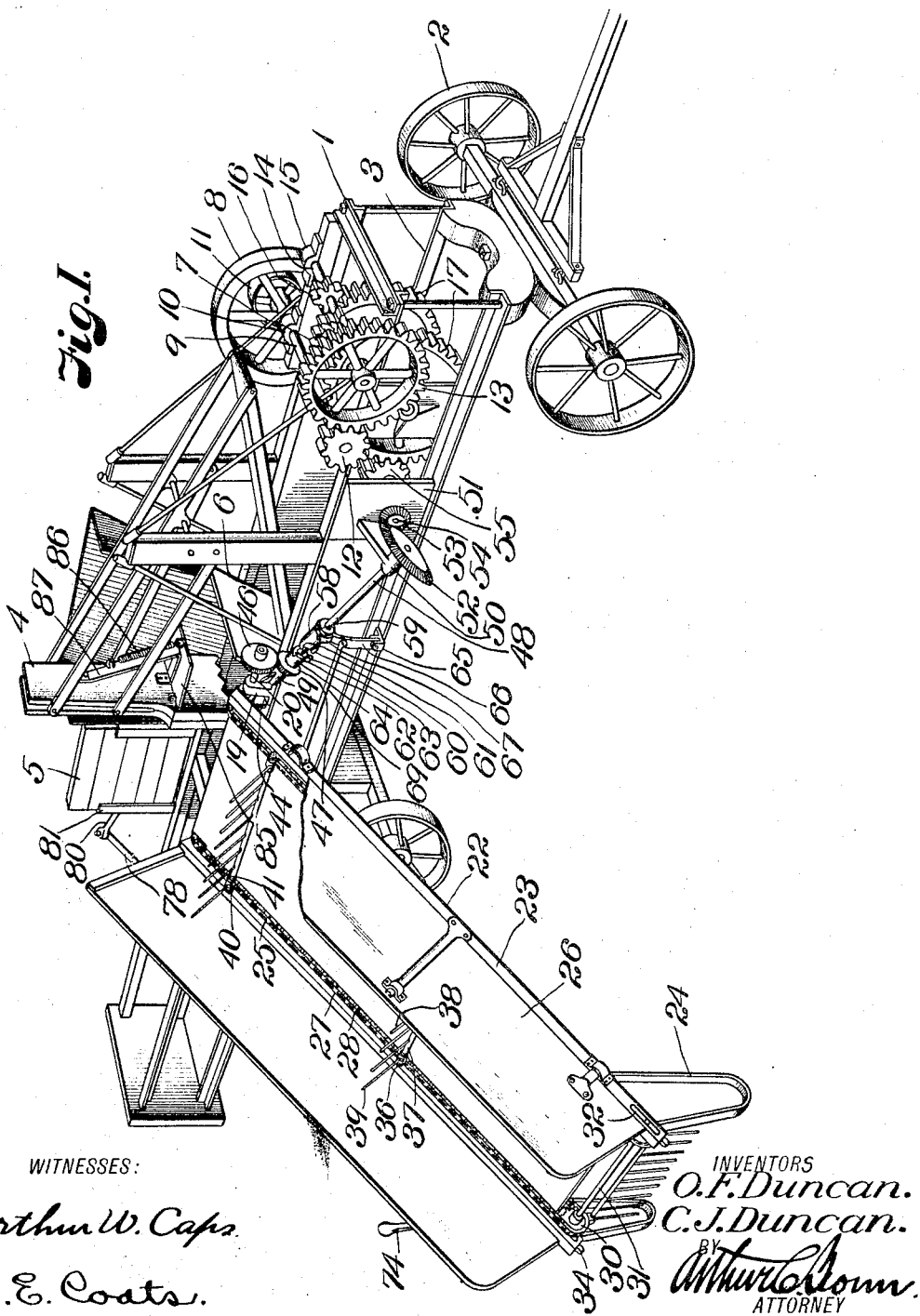
WITNESSES:
Arthur W. Caps.
C. E. Coats.
INVENTORS
O. F. Duncan.
C. J. Duncan.
BY
Arthur C. Crown.
ATTORNEY

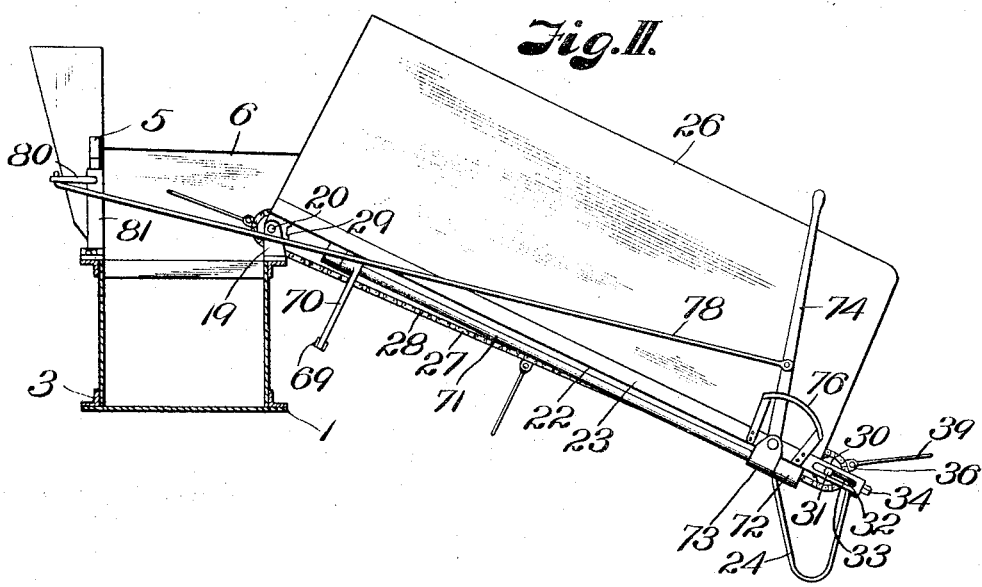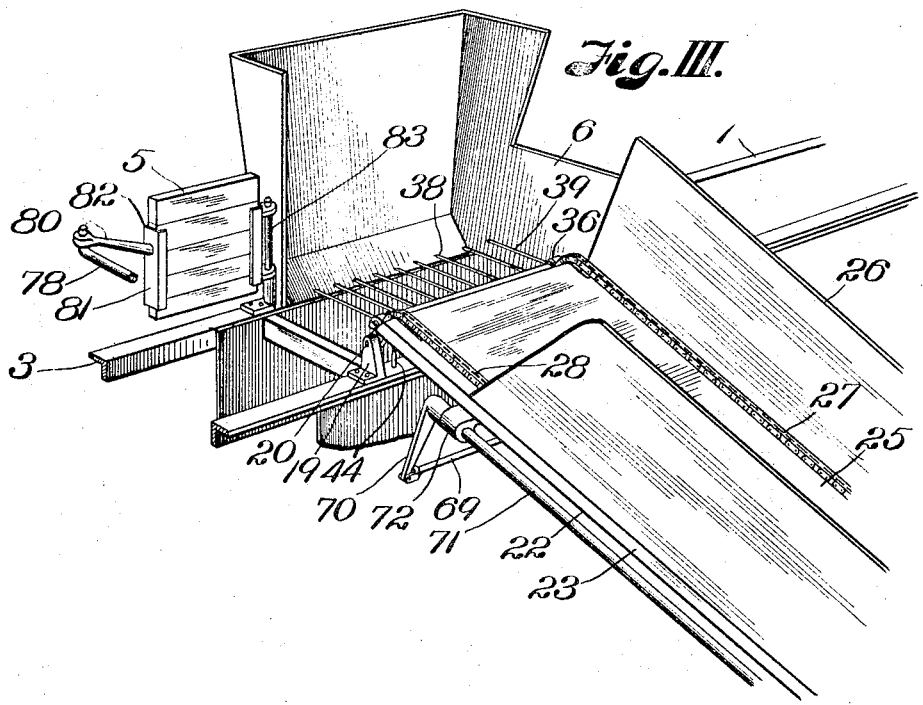

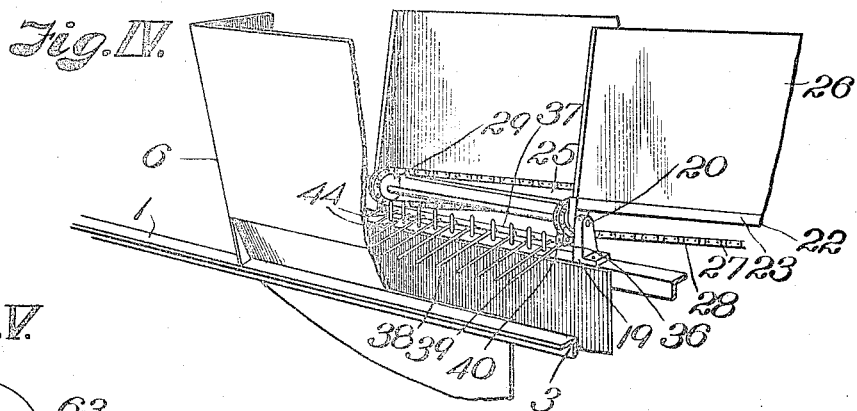
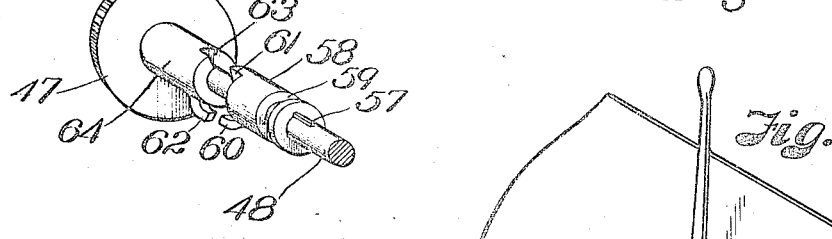
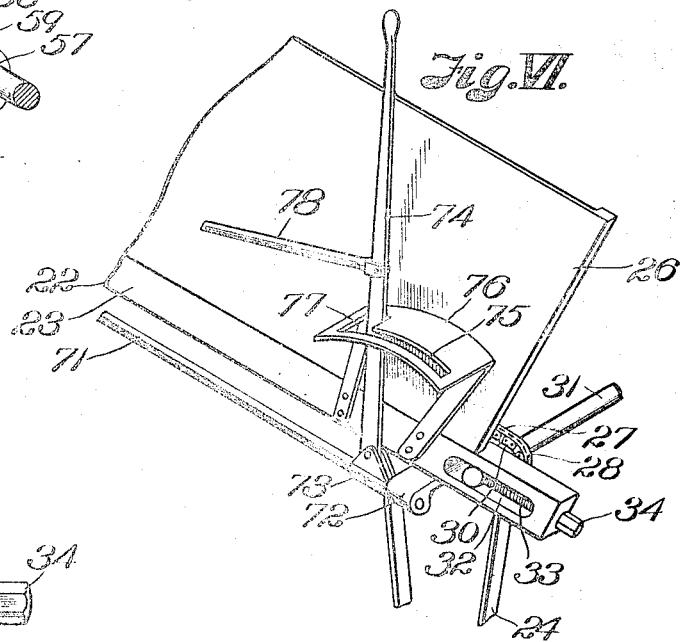
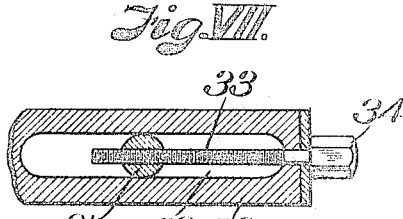
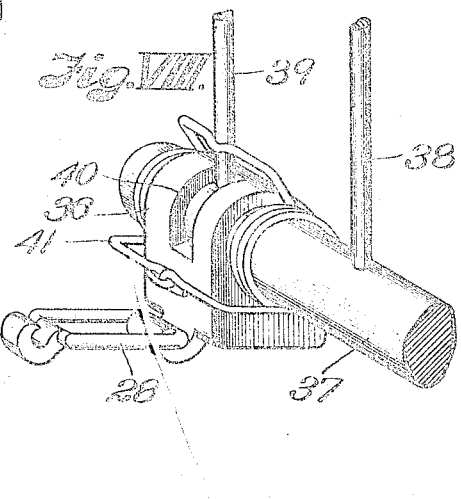

UNITED STATES PATENT OFFICE.

CLAUDE J. DUNCAN AND ORVIL F. DUNCAN, OF GRIDLEY, KANSAS.

FEEDER.

1,114,681.  Specification of Letters Patent.  Patented Oct. 20, 1914.

Application filed October 30, 1913. Serial No. 798,165.

*To all whom it may concern:*

Be it known that we, CLAUDE J. DUNCAN and ORVIL F. DUNCAN, citizens of the United States, residing at Gridley, in the county of Coffey and State of Kansas, have invented certain new and useful Improvements in Feeders; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to improvements in feeders for hay presses, and has for its object to provide a feeder in the nature of a belt conveyer, whereby material is conducted to and delivered into the hopper of a hay press to be compressed and baled.

It is also an object of the invention to provide means for simultaneously stopping the feeder and swinging a header block into position for projection into the hopper.

In accomplishing these objects we have provided improved details of structure, the preferred forms of which are illustrated in the accompanying drawings, wherein:—

Figure I is a perspective view of a hay press equipped with a feeder constructed in accordance with our invention. Fig. II is a side elevation of the feeder, showing a portion of the hay press in transverse section. Fig. III is a detail perspective of a portion of the hay press and feeder, showing the position of the feeder prongs at the point of delivering hay into the hopper and the mounting of the header pan. Fig. IV is a rear perspective view of a portion of the hay press, parts being broken away to show the action of the feeding prongs and cleaning fingers. Fig. V is an enlarged detail perspective of the clutch. Fig. VI is an enlarged detail perspective of the lower end of the feeder, the mounting for the header pan and clutch controlling lever. Fig. VII is a detail section of the feeder belt adjustment. Fig. VIII is a detail perspective of a portion of the conveyer, showing the means for attaching the rake bars to the driving chains, and for tensioning the feeder prongs.

Referring more in detail to the drawings:—

1 designates a hay press of any ordinary construction, comprising ground wheels 2, a frame 3, feeder arm 4, header block 5, hopper 6, and driving gear 7; the latter comprising a shaft 9, which is revolubly mounted in bearings 10 on the frame and carries a flywheel 8 and belt wheel 11. A pinion 12 mounted on the end of the shaft 9 opposite the fly-wheel meshes with a large gear wheel 13 on a shaft 14, which is journaled in bearings 15 on the frame 3. The shaft 14 is provided with pinions 16 meshing with large gear wheels 17, having suitable mechanism (not shown) for vertically reciprocating the feed arm 4; the mechanism for driving the feed arm being of any suitable construction, and as it forms no part of the present invention is not illustrated in detail.

Journaled in brackets 19 on the frame 3, at one side of the hopper, is a shaft 20, and pivotally mounted on the shaft is a feeder frame 22 comprising inclined sills 23 having feet 24 at the lower end whereby the frame is supported from the ground and comprising a longitudinal platform 25 and removable sideboards 26. Sprocket wheels 29 are revolubly mounted on the shaft 20 and sprocket wheels 30 on a shaft 31 at the free end of the feeder frame, and running over said sprocket wheels are link belts 28 upon which the feeding rakes hereinafter described are mounted.

In order to tighten or adjust the conveyer belts, we project the ends of the shaft 31 through slots 32 in the lower ends of the sills 22, and project bolts 33 through the ends of the sills and through threaded apertures in the ends of the shaft 31, so that when the heads 34 of the bolts 33 are turned the shaft 31 is drawn outwardly, or forced inwardly to tighten or loosen the conveyer belts.

At intervals throughout the length of the belts 22 are links 36 (Fig. VIII) having transverse apertures within which the cross bars 37 are revolubly mounted, and fixed in said cross bars are rake teeth 38, which are adapted for projection into the conveyer frame and for forwarding material within the frame when the apparatus is in operation.

In order to allow the rake to revolve in its bearings, so that it may be withdrawn from the hopper after delivering material thereto and to return to functional position, we provide the links 36 with slots 40 and the rake bars 37 with teeth 39 corresponding with the teeth 38, but which are projected through the link slots 40 and are engaged by springs 41, which are mounted on the rake bars and are adapted for yieldingly tensioning the bars to functional position but allow the bars to yield when the rakes engage the edge of the frame as they are turned backwardly beneath the conveyer after delivering material into the hopper.

The frame 3 is provided with fingers 44, which project upwardly therefrom at the inner end of the conveyer and between which the rake teeth travel after the latter moves back over the conveyer, in order to clean the rakes of material and insure the delivery of the complete charges into the hopper.

The mechanism for operating the conveyer belts, comprises a bevel gear 46 on the forward end of the upper conveyer shaft 20, which meshes with a bevel gear 47 that is revolubly mounted on an inclined shaft 48, that is journaled in brackets 49 and 50 on the main frame 3, and is operably connected with the driving shaft 9 through bevel gears 52 and 53, a shaft 54 carrying the bevel gear 53, and the gear wheels 55 and 12.

Slidably mounted on the shaft 48 and keyed against revolution thereon by the feather 57 is a clutch 58 having a shipper groove 59 and having clutch teeth 60 and 61 thereon adapted for engagement with the teeth 62 and 63 on the collar 64 of the bevel gear 47, so that when the clutch members are in engagement and the driving mechanism in operation the conveyer shaft is revolved to forward the rake teeth toward the hopper; the clutches being arranged to engage at a proper point in the revolution of the shaft 48, so that the rakes may operate in proper relation to the up and down movement of the feeder arm.

Pivotally mounted in a bracket 65 on the frame 3 is a shipper lever 66 having arms 67 operatively connected with the grooved portion of the clutch 58, and connected with said lever is a rod 69 which extends beneath the conveyer frame and is pivotally connected with an arm 70 on a rod 71 that extends longitudinally along the conveyer frame and is journaled in brackets 72 and 73 thereon. Fixed on the lower end of rod 71 is a clamp 73 and pivotally mounted in said clamp is a lever 74, which projects through a slot 75 in a keeper member 76 that is fixed on the lower end of the conveyer frame; the inner end of the slot 75 having an inwardly offset portion forming a seat for the lever 74. Pivotally connected with the lever 74 is a rod 78, which extends inwardly and is pivotally connected with an arm 80 on a pivotally mounted header pan 81.

The header pan which we prefer to use comprises a grooved frame 82 which is hingedly mounted on a standard 83 at the outer end of the hopper, so that the pan may move inwardly and outwardly relative to the hopper to bring the header blocks 5 into position for projection into the baling case when engaged by the descending arm 4.

In order to force material from the hopper into the baling case we provide the feeder arm with a shelf 85, which is hingedly mounted on the arm, and has a spring 86 yieldingly retaining the same against a horizontal shelf 87 that is rigidly mounted on the forward face of the arm.

In using the feeder, presuming the parts to be constructed and assembled as described, when the driving mechanism is in operation and the clutch members on the shaft 48 in engagement, the conveyer belts will be carried upwardly through the conveyer frame and the rake teeth projected at right angles to the platform by means of the springs 41, so that material delivered into the conveyer is fed through the conveyer frame and into the hopper of the baling press. As the rakes turn over the end of the conveyer into the hopper they deliver material to the hopper and then engage the upper edge of the frame 3; the engagement of the teeth with the frame causing the rake bar to pivot in its mounting against the tension of the springs 41, so that the rake teeth are withdrawn horizontally from the hopper and pulled through the material instead of turning circumferentially, thereby obviating any tendency to drag the material out of the hopper as the rakes start back beneath the conveyer. When a sufficient quantity of material has been fed into the conveyer to make up a bale, the operator moves the lever 74 laterally away from the conveyer and thereby releases the lever from its keeper and simultaneously rocks the arm 70 to disengage the sliding clutch member from its mate, and thereby interrupt the driving action of the conveyer. After the conveyer has been stopped by lateral movement of the lever, the lever is drawn back through the slot 75 to turn the header pan over and across the baling case at the back of the hopper; the driving member continuing to operate after the conveyer has been stopped, forcing the feeder arm 4 downwardly, so that it engages a header block 5, which is carried in the pan and forces the block out of the pan into the baling case. After the block has been placed the conveyer is again started in operation, so that material is again fed to the hopper and the operation heretofore described continued.

Having thus described our invention what we claim as new therein, and desire to secure by Letters-Patent, is:—

1. The combination with a hay press comprising a hopper, of a conveyer, clutch mechanism controlling the actuation of the conveyer, a header pan, a shipper lever for controlling the clutch, a revoluble rod having crank connection with the shipper lever, a header pan, a lever mounted on the revoluble rod and adapted for pivotal movement in one direction and means connecting said lever with the header pan whereby the rod is rotated by lateral movement of the lever and the pan actuated by pivotal movement thereon.

2. The combination with a hay press comprising a hopper, and a pivotally mounted header pan, of a conveyer, a shaft for driving the conveyer, clutch mechanism for controlling the conveyer shaft, a revoluble rod having crank connection with a loose member of said clutch, a clamp fixed on said rod, a lever pivotally mounted in said clamp, a header pan pivotally mounted adjacent the hopper, and a rod connected with said lever and having crank connection with the header pan whereby the first named rod is rotated under lateral movement of the lever to actuate the clutch member, and the last named rod is moved longitudinally under pivotal movement of the lever to actuate the header pan.

3. The combination with a hay press comprising a hopper, of driving mechanism comprising a clutch having a slide member, a conveyer having a shaft operable from said clutch, a shipper lever for the clutch, a rotatable rod having crank connection with the shipper lever, a clamp fixed on said rod, a keeper member having a longitudinal and a communicating transverse slot, a lever pivotally mounted in said clamp and adapted for travel in the slot in said keeper member, a header pan, and a rod connected with said lever and having crank connection with the header pan.

4. The combination with a hay press comprising a hopper, of a conveyer frame spaced vertically from the press adjacent the hopper, a shaft revolubly mounted on said frame and provided with sprocket wheels, means for driving said shaft, paired belts adapted for travel over said sprocket wheels, paired journal links in said belts having keeper slots, rake bars journaled in said links, rake teeth on said bars, teeth on said bars projected through the link slots, and means for yieldingly retaining said rake bars in functional position.

5. The combination with a hay press comprising a hopper, of a conveyer frame spaced vertically from the press adjacent the hopper, a shaft revolubly mounted on said frame and provided with sprocket wheels, means for driving said shaft, paired belts adapted for travel over said sprocket wheels, paired journal links in said belts having keeper slots, rake bars journaled in said links, rake teeth on said bars, teeth on said bars projected through the link slots, and springs engaging said links and the keeper teeth and yieldingly retaining said rake bars in functional position.

In testimony whereof we affix our signatures in presence of two witnesses.

CLAUDE J. DUNCAN.
ORVIL F. DUNCAN.

Witnesses:
ARTHUR W. CAPS,
L. E. COATS.